United States Patent

Shiozawa et al.

(10) Patent No.: US 9,838,144 B2
(45) Date of Patent: Dec. 5, 2017

(54) NOISE FLOOR LEVEL REDUCTION DEVICE AND NOISE FLOOR LEVEL REDUCTION METHOD

(71) Applicant: ANRITSU CORPORATION, Kanagawa (JP)

(72) Inventors: Yoshihiro Shiozawa, Kanagawa (JP); Shinichi Ito, Kanagawa (JP); Momoko Inadomaru, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 92 days.

(21) Appl. No.: 15/154,014

(22) Filed: May 13, 2016

(65) Prior Publication Data

US 2017/0019194 A1  Jan. 19, 2017

(30) Foreign Application Priority Data

Jul. 15, 2015 (JP) .................................. 2015-141421

(51) Int. Cl.
| | |
|---|---|
| H04W 72/04 | (2009.01) |
| H04L 5/14 | (2006.01) |
| H04B 17/336 | (2015.01) |
| H04B 17/10 | (2015.01) |
| H04B 17/18 | (2015.01) |
| H04B 17/309 | (2015.01) |
| H04W 88/08 | (2009.01) |

(Continued)

(52) U.S. Cl.
CPC ......... *H04B 17/336* (2015.01); *H04B 17/104* (2015.01); *H04B 17/18* (2015.01); *H04B 17/309* (2015.01); *H04L 5/14* (2013.01); *H04B 17/318* (2015.01); *H04B 17/345* (2015.01); *H04W 88/08* (2013.01)

(58) Field of Classification Search
CPC .... H04B 17/336; H04B 17/104; H04B 17/18; H04B 17/309; H04B 17/318; H04B 17/345; H04L 5/14; H04W 88/08
See application file for complete search history.

(56) References Cited

U.S. PATENT DOCUMENTS

| | | | |
|---|---|---|---|
| 2004/0078200 A1* | 4/2004 | Alves .................. | G10L 21/0208 704/233 |
| 2009/0101798 A1* | 4/2009 | Yadid-Pecht ........ | H04N 5/3532 250/208.1 |

(Continued)

FOREIGN PATENT DOCUMENTS

JP  2014-190943 A  10/2014

*Primary Examiner* — Brian D Nguyen
(74) *Attorney, Agent, or Firm* — Pearne & Gordon LLP

(57) ABSTRACT

Provided are a noise floor level reduction device and a noise floor level reduction method capable of reducing a noise floor level. A transmission power measurement system 10 is installed before a signal measurement device 20 including a noise floor level measurement unit 22 that measures a noise floor level, and a measurement unit 24 that subtracts the noise floor level from a level of a signal from a DUT 2 to calculate a level of a signal after subtraction, and includes an LNA 17 provided between the DUT 2 and the signal measurement device 20 for amplifying the signal from the DUT 2, and a termination resistor 16 that terminates an input of the LNA 17, and the termination resistor 16 terminates the input of the LNA 17 in a case in which the noise floor level measurement unit 22 measures the noise floor level.

8 Claims, 5 Drawing Sheets

(51) Int. Cl.
*H04B 17/318* (2015.01)
*H04B 17/345* (2015.01)

(56) References Cited

U.S. PATENT DOCUMENTS

| | | | | |
|---|---|---|---|---|
| 2013/0184022 | A1* | 7/2013 | Schmidt | H04W 52/281 455/509 |
| 2014/0149124 | A1* | 5/2014 | Choo | G10L 19/028 704/500 |
| 2014/0162547 | A1* | 6/2014 | Kummetz | H04B 7/15535 455/9 |
| 2014/0228043 | A1* | 8/2014 | Wigren | H04W 72/1252 455/452.1 |
| 2014/0294199 | A1* | 10/2014 | Otani | G01R 23/173 381/94.3 |
| 2014/0301282 | A1* | 10/2014 | Paiva | H04L 5/0062 370/329 |
| 2015/0141069 | A1* | 5/2015 | Wigren | H04W 24/00 455/522 |

* cited by examiner

| Item | Initial | Flexible Cable | Switch | Isolator | Limiter | Switch | LNA | Switch | Cable | Signal Measurement Device 52 | Margin |
|---|---|---|---|---|---|---|---|---|---|---|---|
|  |  | 3 | 11 | 13 | 14 | 15 | 17 | 18 | 4 | 52 |  |
| Gain/Loss (dB) | – | −4.3 | −0.8 | −0.5 | −1.0 | −0.4 | 20.1 | −0.8 | −0.2 | – |  |
| NF(dB) | – | – | – | – | – | – | 1.08 | – | – | – |  |
| Transmission OFF Power Level (dBm/MHz) | −107.0 | −109.4 | −112.1 | −112.6 | −113.6 | −114.0 | −93.9 | −94.7 | −94.9 | −94.9 |  |
| Noise Floor Level (dBm/MHz) | −113.9 | −113.9 | −113.9 | −113.9 | −113.9 | −113.9 | −92.7 | −93.5 | −93.7 | −93.5 | −1.4dB |

FIG. 3

| Item | Initial | Flexible Cable 3 | Switch 11 | Isolator 13 | Limiter 14 | Switch 15 | LNA 17 | Switch 18 | Cable 4 | Signal Measurement Device 20 |
|---|---|---|---|---|---|---|---|---|---|---|
| Gain/Loss (dB) | — | -4.3 | -0.8 | -0.5 | -1.0 | -0.4 | 20.1 | -0.8 | -0.2 | — |
| NF(dB) | — | — | — | — | — | — | 1.08 | — | — | — |
| Transmission OFF Power Level (dBm/MHz) | -107.0 | -109.4 | -112.1 | -112.6 | -113.6 | -114.0 | -93.9 | -94.7 | -94.9 | -94.9 |
| Noise Floor Level (dBm/MHz) | -113.9 | -113.9 | -113.9 | -113.9 | -113.9 | -113.9 | -92.7 | -93.5 | -93.7 | -101.2 |
| Margin | | | | | | | | | | 6.3dB |

FIG. 4

NOISE FLOOR LEVEL REDUCTION DEVICE AND NOISE FLOOR LEVEL REDUCTION METHOD

TECHNICAL FIELD

The present invention relates to, for example, a noise floor level reduction device and a noise floor level reduction method for reducing a noise floor level at the time of measurement of a signal level that is output from a wireless base station.

BACKGROUND ART

Conventionally, a frequency division duplex (FDD) scheme for dividing an uplink and a downlink based on a frequency and a time division duplex (TDD) scheme for dividing an uplink and a downlink based on a time are known as duplex schemes in a wireless communication system. In the FDD scheme, an uplink signal and a downlink signal are transmitted and received at different frequencies at the same time. On the other hand, in the TDD scheme, the uplink signal and the downlink signal are transmitted and received at different times at the same frequency.

In a wireless communication system using a TDD scheme, since transmission and reception are alternately performed at the same frequency in a wireless base station, transmission ON periods and transmission OFF periods are alternately present in a transmission signal that is transmitted from the wireless base station, as illustrated in FIG. 5.

If a power in the transmission ON period is referred to as a transmission ON power, and a power in the transmission OFF period is referred to as a transmission OFF power, there is a target value of each of the transmission ON power and the transmission OFF power, and evaluation of each target value is performed at the time of evaluation of the wireless base station. In particular, the target value of the transmission OFF power is close to −114 dBm/MHz that is a thermal noise level and is, for example, a very low power of about −107 dBm/MHz. In a case in which the transmission OFF power is measured, it is necessary to use a measurement device of which the noise floor level is sufficiently lower than the transmission OFF power level.

When the transmission OFF power is measured, components such as a cable or a switch are required between the wireless base station and the measurement device. Accordingly, the transmission OFF power level is reduced by such components. Therefore, a configuration of amplifying a signal from the wireless base station before the signal is input to the measurement device as illustrated in FIG. 6 is considered.

That is, a signal measurement system 50 illustrated in FIG. 6 includes a DUT 51 as a wireless base station which is a measurement target, a signal measurement device that measures a transmission OFF power of a signal output by the DUT 51, and a transmission power measurement system 53 provided between the DUT 51 and the signal measurement device 52. The transmission power measurement system 53 includes a low noise amplifier (LNA) 53a that amplifies the transmission OFF power. A trigger signal for synchronizing a frame is output from the DUT 51, and the signal measurement device 52 measures a transmission OFF power level based on the trigger signal. A spectrum analyzer that achieves reduction of a noise floor level (for example, see Patent Document 1) can be suitably used as the signal measurement device 52.

RELATED ART DOCUMENT

Patent Document

[Patent Document 1] JP-A-2014-190943

DISCLOSURE OF THE INVENTION

Problem That the Invention is to Solve

However, in the signal measurement system 50 illustrated in FIG. 6, the noise floor level in the signal measurement device 52 can be reduced by using the spectrum analyzer described in Patent Document 1 as the signal measurement device 52. However, since a noise component of the transmission power measurement system 53 amplified by an LNA 53a is more dominant than a noise component in the signal measurement device 52 at the time of measurement of the transmission OFF power level, there is a problem in that the noise floor level of the entire system rises. As a result, in the signal measurement system 50, a transmission OFF power signal may not be measured due to being buried in noise. Accordingly, an increase in the measurement margin is desired.

The present invention has been made to solve the problems of the related art, and an object thereof is to provide a noise floor level reduction device and a noise floor level reduction method capable of reducing a noise floor level.

Means for solving the problem

A noise floor level reduction device according to claim 1 of the present invention is a noise floor level reduction device (10) installed before a signal measurement device (20) including noise floor level measurement means (22) for measuring a noise floor level of the signal measurement device and signal level calculation means (24) for subtracting the noise floor level from a level of a signal from a device under test (2) to calculate a level of a signal after subtraction, and has a configuration in which the noise floor level reduction device includes amplifying means (17) provided between the device under test and the signal measurement device for amplifying the signal from the device under test; and termination means (16) for terminating an input of the amplifying means, and the termination means terminates the input of the amplifying means on condition that the noise floor level measurement means measures the noise floor level, the device under test outputs a transmission signal based on a time division duplex scheme as an output signal, and the signal level calculation means subtracts the noise floor level from a level of the transmission signal to calculate a level of the transmission signal after subtraction.

With this configuration, in a case in which the noise floor level measurement means of the signal measurement device measures the noise floor level, the termination means of the noise floor level reduction device terminates the input of the amplifying means. Accordingly, the noise floor level measurement means measures the noise floor level involving a measurement system installed before the signal measurement device, and it is possible to obtain a noise floor level lower than the noise floor level of only the signal measurement device.

Thus, the noise floor level reduction device according to claim 1 of the present invention can reduce the noise floor level.

With this configuration, the noise floor level reduction device according to claim 1 of the present invention can reduce the noise floor level at the time of measurement of the level in the ON state and the level in the OFF state of the transmission signal based on the time division duplex scheme.

It is preferable for the noise floor level reduction device according to claim 2 of the present invention to have a configuration in which the noise floor level reduction device further includes path selection means (15) provided between the device under test and the amplifying means for selecting a path to either the device under test and the termination means, and the path selection means selects the path to the termination unit on condition that the noise floor level measurement means measures the noise floor level, and selects the path to the device under test on condition that the signal measurement device measures a level of the signal from the device under test.

The noise floor level reduction device according to claim 3 of the present invention has a configuration in which a level of the signal from the device under test includes a level in an ON state that is a state in which the device under test outputs a signal, and a level in an OFF state that is a state in which the device under test stops the output of the signal.

With this configuration, the noise floor level reduction device according to claim 3 of the present invention can reduce the noise floor level at the time of measurement of the level in the ON state and the level in the OFF state of the signal from the device under test.

A noise floor level reduction method according to claim 4 of the present invention is a noise floor level reduction method using a noise floor level reduction device (10) installed before a signal measurement device (20) including noise floor level measurement means (22) for measuring a noise floor level of the signal measurement device and signal level calculation means (24) for subtracting the noise floor level from a level of a signal from a device under test (2) to calculate a level of a signal after subtraction, the noise floor level reduction device including: amplifying means (17) provided between the device under test and the signal measurement device for amplifying the signal from the device under test; and termination means (16) for terminating an input of the amplifying means, wherein the noise floor level reduction method includes executing a step (S12) of terminating the input of the amplifying means using the termination means on condition that the noise floor level measurement means measures the noise floor level, and wherein the device under test outputs a transmission signal based on a time division duplex scheme as an output signal, and subtracts the noise floor level from a level of the transmission signal to calculate a level of the transmission signal after subtraction.

In the noise floor level reduction method according to claim 5 of the present invention, the noise floor level reduction device further includes: path selection means (15) provided between the device under test and the amplifying means for selecting a path to either the device under test and the termination means, wherein the noise floor level reduction method executes a step (S13) of selecting, by the path selection means, the path to the termination means on condition that the noise floor level measurement means measures the noise floor level, and a step (S17) of selecting, by the path selection means, the path to the device under test on condition that the signal measurement device measures a level of the signal from the device under test.

In the noise floor level reduction method according to claim 6 of the present invention, a level of the signal from the device under test includes a level in an ON state that is a state in which the device under test outputs a signal, and a level in an OFF state that is a state in which the device under test stops the output of the signal.

With this configuration, in a case in which the noise floor level measurement means of the signal measurement device measures the noise floor level, the termination means of the noise floor level reduction device terminates the input of the amplifying means. Accordingly, the noise floor level measurement means measures the noise floor level involving a measurement system installed before the signal measurement device, and it is possible to obtain a noise floor level lower than the noise floor level of only the signal measurement device.

Accordingly, with the noise floor level reduction method according to claims 4 to 6 of the present invention, it is possible to reduce the noise floor level.

Advantage of the Invention

The present invention can provide a noise floor level reduction device and a noise floor level reduction method having an effect that the noise floor level can be reduced.

BRIEF DESCRIPTION OF THE DRAWINGS

FIG. 3 is a diagram illustrating a measurement margin in a signal measurement system of the related art.

FIG. 4 is a diagram illustrating a measurement margin in an embodiment of the signal measurement system according to the present invention.

BEST MODE FOR CARRYING OUT THE INVENTION

Hereinafter, embodiments of the present invention will be described with reference to the accompanying drawings. An example in which a noise floor level reduction device of the present invention is applied to a signal measurement system will be described.

First, a configuration of the signal measurement system in this embodiment will be described.

Figure 1:
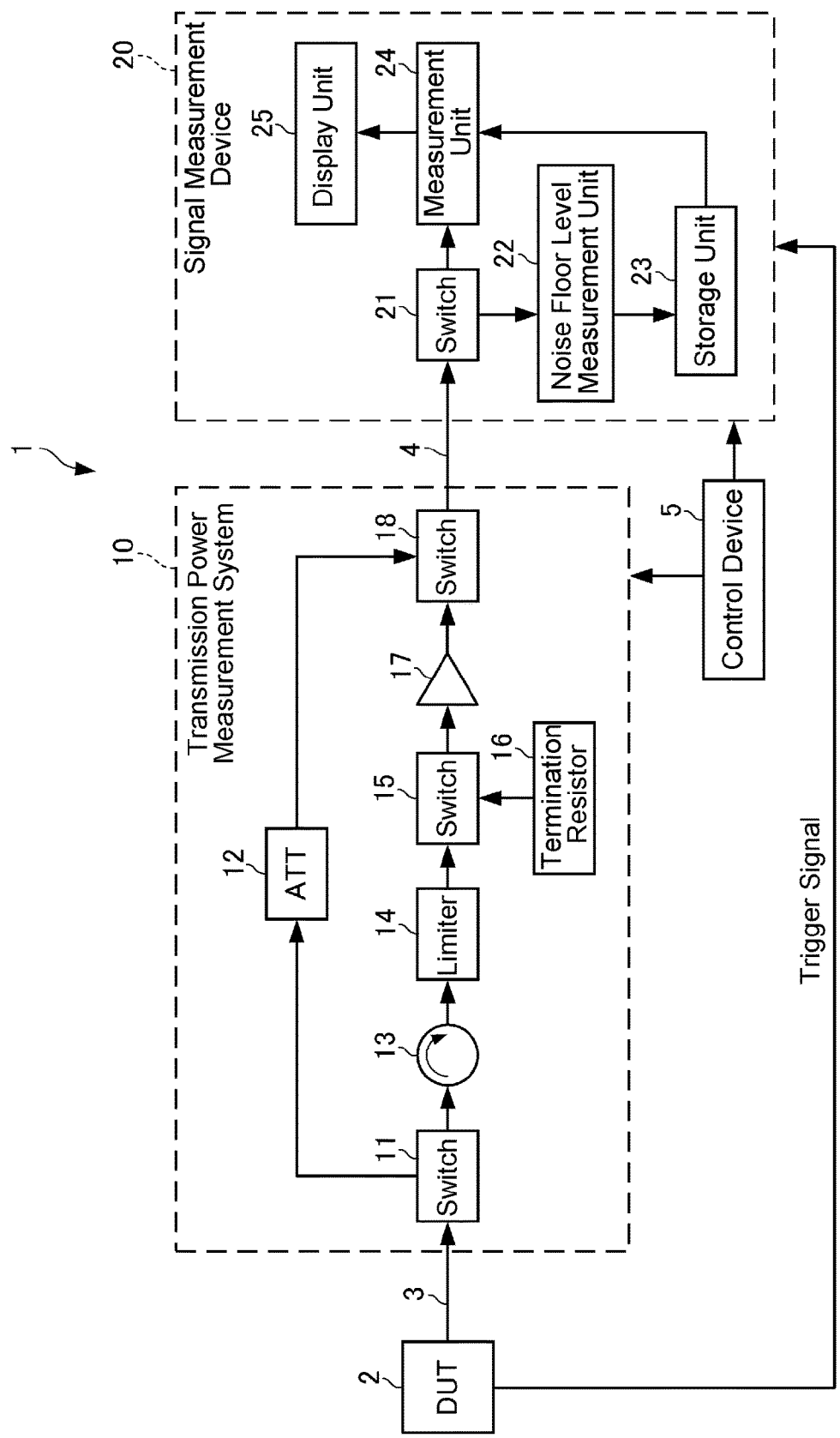
FIG. 1 is a block configuration diagram of an embodiment of a signal measurement system according to the present invention.

As illustrated in FIG. 1, a signal measurement system 1 of this embodiment includes a device under test (DUT) 2, a flexible cable 3, a cable 4, a control device 5, a transmission power measurement system 10, and a signal measurement device 20.

Figure 5:
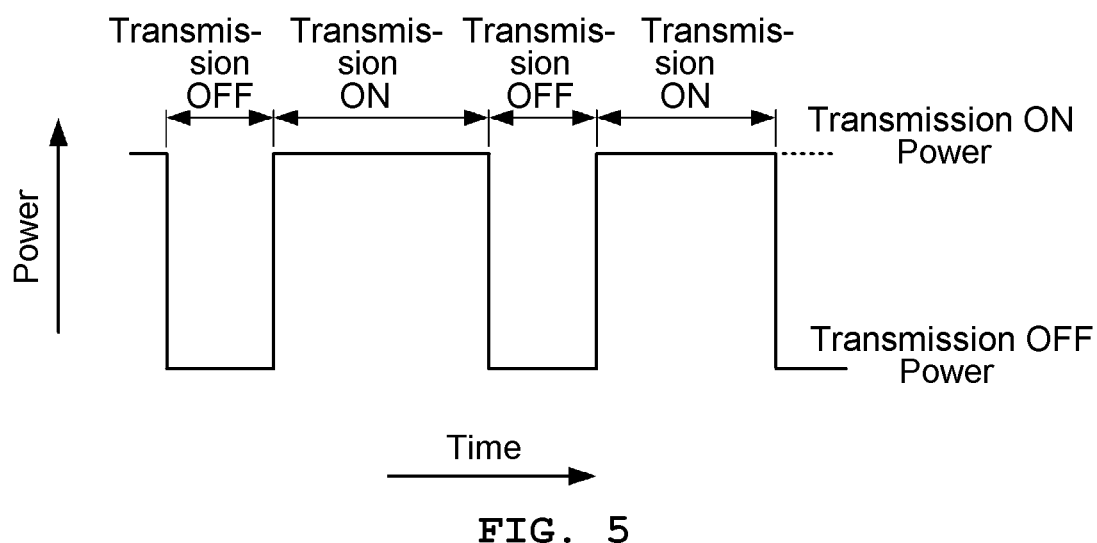
FIG. 5 is a diagram illustrating a transmission ON period and a transmission OFF period of a transmission signal that is transmitted from a wireless base station in a wireless communication system using a TDD scheme.

The DUT 2 is, for example, a base station device that outputs a transmission signal based on a TDD scheme. This output signal includes a transmission ON power and a transmission OFF power, as illustrated in FIG. 5. This DUT 2 is an example of a device under test.

The flexible cable 3 is connected between the DUT 2 and the transmission power measurement system 10, and outputs an output signal of the DUT 2 to the transmission power measurement system 10.

The cable 4 is connected between the transmission power measurement system 10 and the signal measurement device 20, and outputs an output signal of the transmission power measurement system 10 to the signal measurement device 20.

The control device 5 includes, for example, a personal computer, and controls operations of the transmission power measurement system 10 and the signal measurement device 20.

The transmission power measurement system 10 includes a switch 11, an ATT 12, an isolator 13, a limiter 14, a switch 15, a termination resistor 16, a low noise amplifier (LNA) 17, and a switch 18. This transmission power measurement system 10 is an example of a noise floor level reduction device.

The signal measurement device 20 includes a switch 21, a noise floor level measurement unit 22, a storage unit 23, a measurement unit 24, and a display unit 25.

The switch 11 switches between a path toward the ATT 12 and a path toward the isolator 13. The path toward the ATT 12 is a path in a case in which the transmission ON power is measured. The path toward the isolator 13 is a path in a case in which the transmission OFF power is measured. That is, the switch 11 switches between a mode for measuring the transmission ON power (referred to as a transmission ON power measurement mode) and a mode for measuring the transmission OFF power (referred to as a transmission OFF power measurement mode).

In a case in which the transmission ON power measurement mode is selected by the switch 11, the ATT 12 receives a transmission signal, attenuates the transmission signal to a predetermined level, and outputs the resultant transmission signal to the switch 18.

The amount of attenuation of the ATT 12 is set by the control device 5, and information on the attenuation amount of the ATT 12 is structured to be acquired by the measurement unit 24.

The isolator 13 transmits a signal from the DUT 2 in one direction from the DUT 2 to the signal measurement device 20.

The limiter 14 limits the transmission ON power to a predetermined level to protect the LNA 17 in the transmission OFF power measurement mode.

The switch 15 connects one of the limiter 14 and the termination resistor 16 to the LNA 17. Specifically, the switch 15 selects a path to the termination resistor 16 in a case in which the noise floor level measurement unit 22 measures the noise floor level, and selects a path to the DUT 2 in a case in which the signal measurement device 20 measures the level of the signal from the DUT 2. The switch 15 is an example of path selection means.

The termination resistor 16 terminates an input of the LNA 17 in a case in which the noise floor level measurement unit 22 measures the noise floor level. This termination resistor 16 is an example of termination means.

The LNA 17 amplifies an output signal of the switch 15, that is, the signal from the DUT 2 at a predetermined amplification rate, and outputs the resultant signal to the switch 18. This LNA 17 is one example of amplifying means.

The switch 18 selects one of the ATT 12 and the LNA 17, and outputs an output signal of the selected ATT 12 or the LNA 17 to the switch 21 of the signal measurement device 20. Specifically, the switch 18 selects the ATT 12 and outputs the output signal of the ATT 12 to the switch 21 in the transmission ON power measurement mode. On the other hand, the switch 18 selects the LNA 17 and outputs the output signal of the LNA 17 to the switch 21 in the transmission OFF power measurement mode.

The switch 21 outputs the signal from the switch 18 to either the noise floor level measurement unit 22 or the measurement unit 24.

In a case in which the termination resistor 16 is selected by the switch 15 and the input of the LNA 17 is terminated by the termination resistor 16, the noise floor level measurement unit 22 measures the noise floor level involving the transmission power measurement system 10 through the switch 21. This noise floor level measurement unit 22 is an example of noise floor level measurement means.

The storage unit 23 stores data of the noise floor level measured by the noise floor level measurement unit 22.

The measurement unit 24 measures the transmission ON power and the transmission OFF power of the signal from the DUT 2 through the switch 21. Further, the measurement unit 24 reads the data of the noise floor level from the storage unit 23, and subtracts the noise floor level from the level of the signal from the DUT 2 to calculate the level of the signal after subtraction. The measurement unit 24 operates based on a trigger signal for synchronizing a frame from the DUT 2 when measuring the level of the signal from the DUT 2. This measurement unit 24 is an example of signal level calculation means.

The display unit 25 includes, for example, a liquid crystal display, and displays data of the transmission ON power and the transmission OFF power measured by measurement unit 24.

Next, an operation of the signal measurement system 1 in this embodiment will be described.

Figure 2:
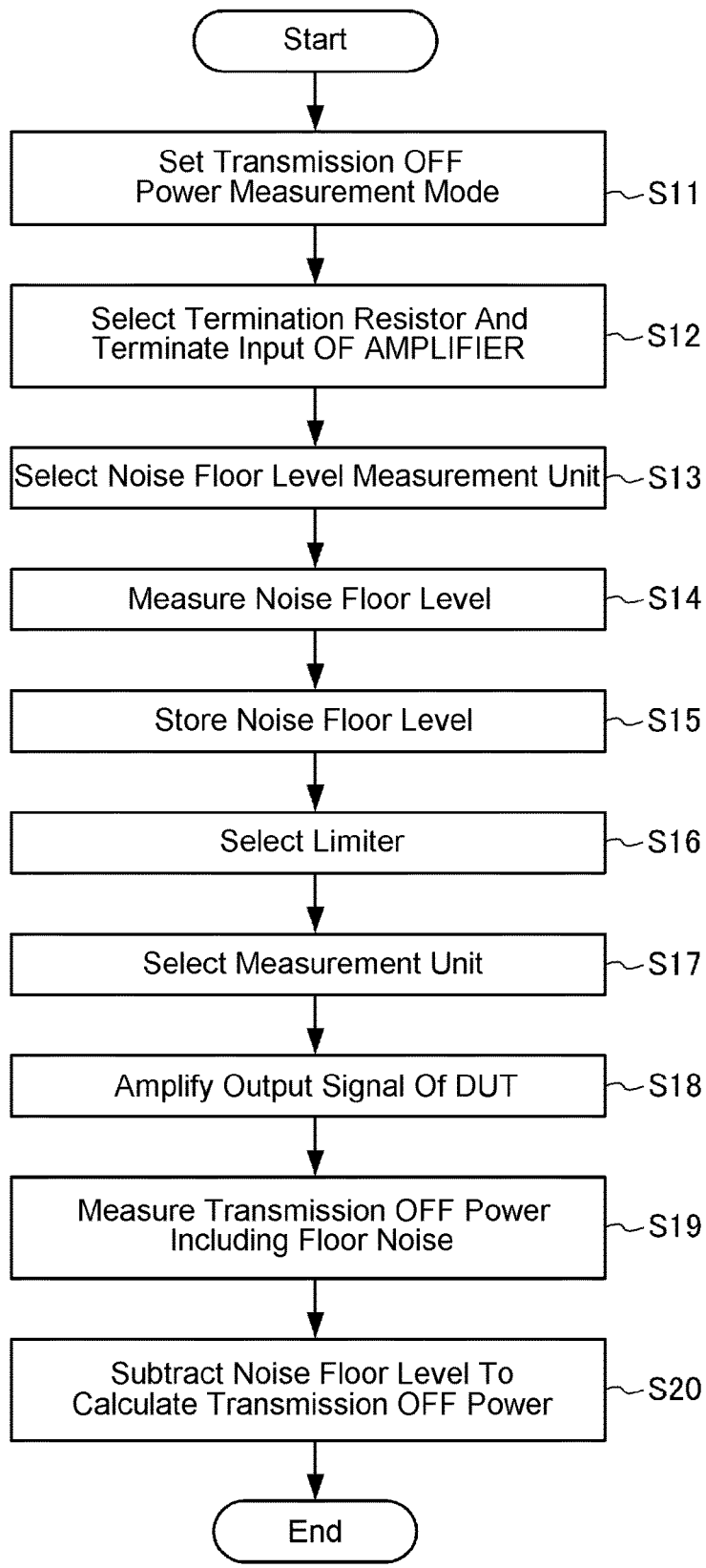
FIG. 2 is a flowchart in an embodiment of the signal measurement system according to the present invention.

First, an operation of the signal measurement system 1 in the transmission OFF power measurement mode will be described with reference to FIG. 2.

The control device 5 sets the transmission OFF power measurement mode (step S11). Specifically, the control device 5 outputs a switch switching control signal to the switches 11 and 18 to cause the switch 11 to select the isolator 13 and the switch 18 to select the LNA 17.

The control device 5 outputs a switch switching control signal to the switch 15 to cause the switch 15 to select the termination resistor 16 (step S12).

The control device 5 outputs a switch switching control signal to the switch 21 to cause the switch 21 to select the noise floor level measurement unit 22 (step S13).

The noise floor level measurement unit 22 measures the noise floor level (step S14).

The noise floor level measurement unit 22 stores data of the measured noise floor level in the storage unit 23 (step S15).

the control device 5 outputs a switch switching control signal to the switch 15 to cause the switch 15 to select the limiter 14 (step S16).

The control device 5 outputs a switch switching control signal to the switch 21 to cause the switch 21 to select the measurement unit 24 (step S17).

The LNA 17 receives the signal from the DUT 2 via a path from the switch 11 to the switch 15 and amplifies the signal (step S18). The amplified signal is input to the measurement unit 24 via the switches 18 and 21.

The measurement unit 24 measures the transmission OFF power in the signal from the DUT 2 based on a trigger signal (step S19). This transmission OFF power is a power including a floor noise power.

The measurement unit 24 reads the data of the noise floor level from the storage unit 23, and subtracts the noise floor level from the transmission OFF power measured in step S19 to calculate a true transmission OFF power from which the noise floor level has been removed (step S20).

Next, an operation of the signal measurement system in the transmission ON power measurement mode will be described with reference to FIG. 1.

The control device 5 sets the transmission ON power measurement mode. Specifically, the control device 5 outputs a switch switching control signal to the switches 11 and 18 to cause the switches 11 and 18 to select the ATT 12.

The control device 5 outputs a switch switching control signal to the switch 21 to cause the switch 21 to select the measurement unit 24.

The measurement unit 24 measures the transmission ON power in the signal from the DUT 2 based on a trigger signal. This transmission ON power is negligible, but is power including a floor noise.

The measurement unit 24 reads the data of the noise floor level from the storage unit 23, and subtracts the noise floor level from the measured transmission ON power to calculate a true transmission ON power from which the noise floor level has been removed.

Figure 6:
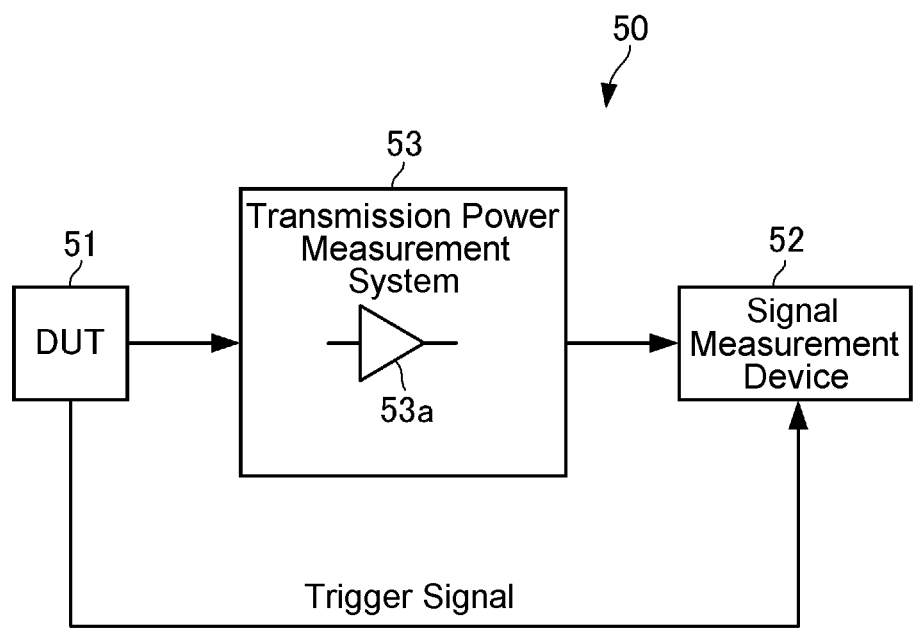
FIG. 6 is a block configuration diagram of a signal measurement system of the related art.

Next, effects obtained by the signal measurement system 1 in this embodiment will be described through a comparison with the related art with reference to FIGS. 3 and 4. FIG. 3 illustrates a result of a difference (referred to as a measurement margin) between the transmission OFF power and the noise floor level in the signal measurement system 50 (see FIG. 6) of the related art. FIG. 4 illustrates a result of the measurement margin in the signal measurement system 1 in this embodiment.

FIGS. 3 and 4 show values of respective items of a gain/loss, negative feedback (NF), a transmission OFF power level, and a noise floor level in each component.

For example, in the item of the transmission OFF power level, an initial value thereof is −107.0 dBm/MHz, and this indicates a target value of an output level of the DUT 2. This value decreases as shown in FIGS. 3 and 4 with the passage through each component, is −114.0 dBm/MHz at the time of output of the switch 15, and is amplified to −93.9 dBm/MHz by the LNA 17.

The signal measurement system 50 of the related art has a configuration in which the termination resistor 16 in the signal measurement system 1 according to this embodiment (see FIG. 1) is not included. Accordingly, as illustrated in FIGS. 3 and 4, the values of the respective items of the gain/loss, the NF, the transmission OFF power level, and the noise floor level are the same in a range from the flexible cable 3 to the cable 4.

However, in the signal measurement system 50 of the related art, since a noise component of the transmission power measurement system 53 (see FIG. 6) amplified by the LNA 53a is more dominant than the noise component in the signal measurement device 52, the noise floor level of the signal measurement device 52 is −93.5 dBm/MHz. In this case, the transmission OFF power level received by the signal measurement device 52 is −94.9 dBm/MHz, and a measurement margin is −1.4 dBm/MHz.

Therefore, in the signal measurement system 50 of the related art, since the transmission OFF power level is lower than the noise floor level, the transmission OFF power level cannot be evaluated.

on the other hand, in the signal measurement system 1 according to this embodiment, since the input of the LNA is terminated by the termination resistor 16 in the transmission power measurement system 10 (see FIG. 1) at the time of measurement of the noise floor level, the noise floor level, including the transmission power measurement system 10, can be measured.

As a result, as illustrated in FIG. 4, in the signal measurement system 1 in this embodiment, −101.2 dBm/MHz is obtained as the noise floor level of the signal measurement device 20. In this case, since the transmission OFF power level received by the signal measurement device 20 is −94.9 dBm/MHz, a measurement margin is 6.3 dBm/MHz.

Therefore, in the signal measurement system 1 in this embodiment, since the transmission OFF power level is sufficiently higher than the noise floor level, it is possible to suitably evaluate the transmission OFF power level.

As described above, since the signal measurement system 1 in this embodiment has a configuration in which the termination resistor 16 of the transmission power measurement system 10 terminates the input of the LNA 17 in a case in which the noise floor level measurement unit 22 of the signal measurement device 20 measures the noise floor level, the noise floor level measurement unit 22 measures the noise floor level involving the measurement system installed before the signal measurement device 20. Accordingly, it is possible to obtain the noise floor level lower than the noise floor level of only the signal measurement device 20.

Accordingly, the signal measurement system 1 in this embodiment can reduce the noise floor level.

In the above-described embodiment, the fact that a significant measurement margin is obtained for measurement of the transmission OFF power has been described in connection with the example in which the device under test is a base station apparatus that outputs a transmission signal based on the TDD scheme, but the present invention is not limited thereto and can be suitably applied to an apparatus in which it is necessary to reduce the noise floor level at the time of measurement of a relatively low level signal.

INDUSTRIAL APPLICABILITY

As described above, the noise floor level reduction device and the noise floor level reduction method according to the present invention have an effect that the noise floor level can be reduced, and are useful as a noise floor level reduction device and a noise floor level reduction method for reducing the noise floor level at the time of measurement of the signal level that is output from the wireless base station.

DESCRIPTION OF REFERENCE NUMERALS AND SIGNS

1 signal measurement system
2 DUT (device under test)
3 flexible cable
4 cable
5 control device
10 transmission power measurement system (noise floor level reduction device)
11 switch
12 ATT
13 isolator
14 limiter
15 switch (path selection means)
16 termination resistor (termination means)
17 LNA (amplifying means)
18 switch
20 signal measurement device
21 switch
22 noise floor level measurement unit (noise floor level measurement means)
23 storage unit
24 measurement unit (signal level calculation means)
25 display unit

What is claimed is:

1. A noise floor level reduction device installed before a signal measurement device comprising noise floor level measurement means for measuring a noise floor level of the signal measurement device and signal level calculation means for subtracting the noise floor level from a level of a signal from a device under test to calculate a level of a signal after subtraction, the noise floor level reduction device comprising:

amplifying means provided between the device under test and the signal measurement device for amplifying the signal from the device under test; and termination means for terminating an input of the amplifying means, wherein the termination means terminates the input of the amplifying means on condition that the noise floor level measurement means measures the noise floor level, the device under test outputs a transmission signal based on a time division duplex scheme as an output signal, and the signal level calculation means subtracts the noise floor level from a level of the transmission signal to calculate a level of the transmission signal after subtraction.

2. The noise floor level reduction device according to claim 1, further comprising:

path selection means provided between the device under test and the amplifying means for selecting a path to either the device under test and the termination means, wherein the path selection means selects the path to the termination means on condition that the noise floor level measurement means measures the noise floor level, and selects the path to the device under test on condition that the signal measurement device measures a level of the signal from the device under test.

3. The noise floor level reduction device according to claim 1, wherein a level of the signal from the device under test includes a level in an ON state that is a state in which the device under test outputs a signal, and a level in an OFF state that is a state in which the device under test stops the output of the signal.

4. The noise floor level reduction device according to claim 2, wherein a level of the signal from the device under test includes a level in an ON state that is a state in which the device under test outputs a signal, and a level in an OFF state that is a state in which the device under test stops the output of the signal.

5. A noise floor level reduction method using a noise floor level reduction device installed before a signal measurement device comprising noise floor level measurement means for measuring a noise floor level of the signal measurement device and signal level calculation means for subtracting the noise floor level from a level of a signal from a device under test to calculate a level of a signal after subtraction, the noise floor level reduction device comprising:

amplifying means provided between the device under test and the signal measurement device for amplifying the signal from the device under test; and termination means for terminating an input of the amplifying means, wherein the noise floor level reduction method comprises executing a step (S12) of terminating the input of the amplifying means using the termination means on condition that the noise floor level measurement means measures the noise floor level, and wherein the device under test outputs a transmission signal based on a time division duplex scheme as an output signal, and subtracts the noise floor level from a level of the transmission signal to calculate a level of the transmission signal after subtraction.

6. The noise floor level reduction method according to claim 5, wherein the noise floor level reduction device further comprises:

path selection means provided between the device under test and the amplifying means for selecting a path to either the device under test and the termination means, wherein noise floor level reduction method executes a step (S13) of selecting, by the path selection means, the path to the termination means on condition that the noise floor level measurement means measures the noise floor level, and a step (S17) of selecting, by the path selection means, the path to the device under test on condition that the signal measurement device measures a level of the signal from the device under test.

7. The noise floor level reduction method according to claim 6, wherein a level of the signal from the device under test includes a level in an ON state that is a state in which the device under test outputs a signal, and a level in an OFF state that is a state in which the device under test stops the output of the signal.

8. The noise floor level reduction method according to claim 5, wherein a level of the signal from the device under test includes a level in an ON state that is a state in which the device under test outputs a signal, and a level in an OFF state that is a state in which the device under test stops the output of the signal.

* * * * *